UNITED STATES PATENT OFFICE 2,620,355

TRIS(TETRAALKYLDIAMIDOPHOSPHORYL) PHOSPHATES

Henry Tolkmith, Midland, Mich., assignor to The Dow Chemical Company, Midland, Mich., a corporation of Delaware No Drawing. Application August 17, 1951, Serial No. 242,401

6 Claims. (Cl. 260—545)

The present invention is concerned with certain new and useful phosphate compounds and a novel method for the production of polyphosphate compounds.

The new compounds are tris(tetraalkyldiamidophosphoryl) phosphates of the formula

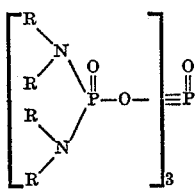

In this and succeeding formulae, each symbol R represents an alkyl radical containing from one to four carbon atoms, inclusive. These tetraphosphates are viscous oils, somewhat soluble in many organic solvents and water. They are of particular value as toxic constituents of parasiticide compositions, and as intermediates for the preparation of other phosphate derivatives. Their use as intermediates for the production of certain valuable parasiticides is disclosed in my copending application Serial No. 242,403 filed concurrently herewith.

The new compounds may be prepared by mixing or otherwise blending a compound of the formula

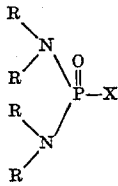

with a compound of the formula

in which formulae X is a member of the group consisting of chlorine and R—O— and Y is the other member of said group. The mixture is then heated at a temperature of from 90° to 135° C. whereby by-product alkyl chloride is evolved (RCl), the heating being continued until the evolution of alkyl chloride of reaction is substantially complete.

Although the theory governing the reaction herein described is not completely understood, it appears to involve a condensation resulting in the formation of an alkyl chloride of reaction. The process might be represented as taking place according to either or both of the following equations:

(A)

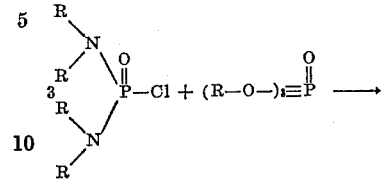

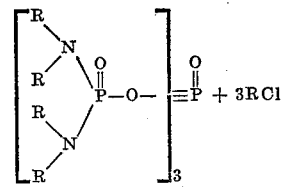

(B)

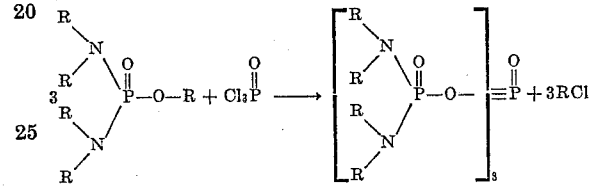

The proportion of at least 3 moles of the tetraalkyldiamidophosphoric chloride per mole of the tri (lower alkyl) phosphate (as shown in equation A) and the proportion of at least 3 moles of the O-alkyl tetraalkyldiamidophosphate per mole of the phosphorus oxychloride (as shown in equation B) is critical for the accomplishment of the desired reaction, i. e. the synthesis of the tris(tetraalkyldiamidophosphoryl) phosphates. If desired, a small excess of the tetraalkyldiamidophosphoric chloride or the O-alkyl tetraalkyldiamidophosphate may be employed, and a large excess does not affect the course of the reaction, but is undesirable from the standpoint of economy. A significantly lesser proportion is not desirable since it reduces the yield of the tetraphosphate compound and results in the formation of other phosphorus derivatives. The expression "lower alkyl" as herein employed refers to methyl, ethyl, propyl or butyl.

The process of the present invention proceeds smoothly at the temperature range of from 90° to 135° C. Since the desired products are somewhat unstable and have a tendency to rearrange into other phosphate materials at temperatures in excess of 135° C., reaction temperatures substantially in excess of 135° C. for any appreciable period of time should be avoided.

The rate at which the reaction takes place has been found to vary directly with the temperature employed. In practice, the reaction is generally carried out over a period of from 2 to 6 hours, or longer, the longer reaction periods being employed at the lower temperatures. In operating at a temperature of from 125° to 135° C., the reaction is essentially complete in about 2 hours.

In carrying out the process, the total reactant charge may be mechanically mixed and then heated for a period of time. Alternatively, either reactant may be added portionwise to the other under conditions of elevated temperature in the reaction vessel. In another procedure, the reaction mixture may be heated at a temperature of 90° C. or somewhat higher for a time, and the temperature thereafter raised to from 125° to 135° C. for a short period to complete the reaction. If desired, the reaction may be carried out in an inert organic solvent such as toluene, xylene and chlorobenzene.

The contacting of the reactants, as above described, may be carried out under any practical operating pressure. Since the alkyl chlorides produced in the process are frequently gases or low boiling liquids, operation under somewhat increased pressure is sometimes preferred in order to avoid the loss of the alkyl chloride by-products. However, where it may be desired to recover the by-products as produced, the operation may be carried out at atmospheric or reduced pressure, and such separation and recovery of alkyl chloride as formed constitutes a preferred method of operation.

A potentially valuable mode of operation consists of carrying out the foregoing preparation as a continuous process. Thus, the two reactants may be mixed or otherwise blended and metered through a suitable reaction zone or controlled temperature, at such a rate as to accomplish the formation of the desired compound in high yield during the reaction interval. In such operation, any suitable pressure and temperature may be maintained and by-product alkyl chloride bled out of the system as desired.

Following the reaction, the mixture may be distilled under reduced pressure and under 135° C. to separate low boiling constituents and to obtain as a residue the desired tris(tetraalkyldiamidophosphoryl) phosphate product.

The following examples illustrate the invention and are not to be construed as limiting:

Example 1

87 grams (0.512 mole) of tetramethylamidophosphoric chloride (having a density of 1.1823 and a refractive index $n/D$ of 1.4670 at 20° C.) and 31 grams (0.17 mole) of triethylphosphate were mixed together and the resulting dispersion heated at from 125° to 128° C. until the evolution of ethyl chloride of reaction was substantially complete. The heating was carried out with stirring and over a period of about 3 hours. During the heating, ethyl chloride was separated and recovered from the reaction zone as formed. A tris(tetramethyldiamidophosphoryl) phosphate product was thereby obtained in substantially quantitative yield as a yellow viscous oil having a refractive index $n/D$ of 1.4685 at 20° C., a density of 1.2474 at 20° C., and a nitrogen content of 16.78 percent as compared to a theoretical nitrogen content of 16.5 percent.

Example 2

18 grams (0.1 mole) of O-ethyl tetramethyldiamidophosphate (having a density 1.0230 and a refractive index $n/D$ of 1.4409 at 20° C.) and 4.95 grams (0.0322 mole) of phosphorus oxychloride were mixed together and the resulting dispersion heated with agitation at a temperature of 125° C., while driving off by-product ethyl chloride and until no further substantial amounts of ethyl chloride were liberated. During the heating, which was carried out over a period of about 5 hours, ethyl chloride was recovered from the reaction zone as formed. As a result of these operations, there was obtained in substantially quantitative yield a tris(tetramethyldiamidophosphoryl) phosphate product.

Example 3

9.5 grams (0.028 mole) of tetrabutyldiamidophosphoric chloride (having a density of 1.0257 and a refractive index $n/D$ of 1.4661 at 20° C.) and 1.7 grams (0.0093 mole) of triethylphosphate were mixed together and the resulting dispersion heated at 130° C. to 135° C. until the evolution of ethyl chloride of reaction was substantially complete. The heating was carried out with stirring and over a period of about 2 hours. During the heating, ethyl chloride of reaction was separated and recovered from the reaction zone substantially as formed. Following the reaction, the reaction mixture was distilled under reduced pressure at gradually increasing temperatures up to a temperature of 130° C. to separate low boiling constituents and to obtain as a residue a tris(tetrabutyldiamidophosphoryl) phosphate product. The latter is a viscous oil having a refractive index $n/D$ of 1.4600.

Example 4

15 grams (0.06 mole) of O-methyl N,N-dimethyl-N',N'-dibutyldiamidophosphate (having a refractive index $n/D$ of 1.4465 at 20° C.) and 2.07 grams (0.02 mole) of phosphorus oxychloride were mixed together and the resulting dispersion heated with agitation at a temperature of 130° C. until no substantial amounts of methyl chloride of reaction were evolved. During the heating, which was carried out over a period of about 2.5 hours, methyl chloride was separated and recovered from the reaction zone as formed. As a result of these operations there was obtained in substantially quantitative yield a tris (N,N-dimethyl - N',N' - dibutyldiamidophosphoryl) phosphate product. The latter is a viscous oil having a refractive index $n/D$ of 1.4622 and a molecular weight of 754 as compared to a theoretical molecular weight of 752.

In a similar manner other tris(tetraalkyldiamidophosphoryl) phosphates may be prepared as follows:

Tris(N-methyl-N-isopropyl-N'-methyl-N'-isopropyldiamidophosphoryl) phosphate by reacting together N-methyl-N-isopropyl-N' - methyl - N'-isopropyldiamidophosphoric chloride and trimethylphosphate.

Tris(N,N - dimethyl-N',N'-diisopropyldiamidophosphoryl) phosphate by reacting together N,N-dimethyl - N',N' - diisopropyldiamidophosphoric chloride and tributylphosphate.

Tris(N,N - dimethyl - N',N' - diethyldiamidophosphoryl) phosphate by reacting together O-butyl N,N - dimethyl - N',N' - diethyldiamidophosphate and phosphorus oxychloride.

Tris(tetraethyldiamidophosphoryl) phosphate by reacting together tetraethyldiamidophosphoric chloride and triethylphosphate.

The O-alkyl tetraalkyldiamidophosphates employed as starting materials, as above described, may be prepared by reacting a tetraalkyldiamidophosphoric chloride with a suitable sodium alcoholate. Satisfactory yields are obtained when employing one molecular proportion of the tetraalkyldiamidophosphoric chloride with each molecular proportion of the alcoholate. The reaction takes place smoothly at the temperature range of from 30° to 90° C. The reaction is somewhat exothermic, the temperature being controlled by the addition and subtraction of heat, if required. Following the reaction, the crude mixture may be filtered and the filtrate fractionally distilled under reduced pressure to separate the desired O-alkyl tetraalkyldiamidophosphate product.

The tetraalkyldiamidophosphoric chlorides employed in the preparation of the tris(tetraalkyldiamidophosphoryl) phosphates and the O-alkyl tetraalkyldiamidophosphates as previously described may be prepared by reacting phosphorus oxychloride (POCl₃) with at least one and no more than two amines of the formula

successively to displace two of the chlorines in the phosphorus oxychloride with amido groups. In this formula R and R' represent the same or different alkyl radicals containing 1 to 4 carbon atoms, inclusive. The reaction is carried out in a sufficient excess of the amine reactant to act as acceptor for by-product hydrogen chloride.

Where it is desired to introduce two identical amido groups into the molecule, 1 molecular proportion of the phosphorus oxychloride is reacted with 2 molecular proportions of the amine. Where it is desired that the substituting amido groups differ, 1 molecular proportion of the phosphorus oxychloride is successively reacted with 1 molecular proportion of each amine.

The reaction takes place smoothly at the temperature range of from 0° to 40° C. The reaction is somewhat exothermic and the temperature may be controlled by the addition and subtraction of heat, if required. Upon completion of the reaction, the crude mixture may be filtered and the filtrate fractionally distilled under reduced pressure to separate the desired product.

I claim:

1. A tris(tetraalkyldiamidophosphoryl) phosphate of the formula

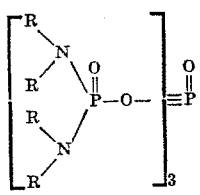

wherein each R represents an alkyl radical containing from 1 to 4 carbon atoms, inclusive.

2. Tris(tetramethyldiamidophosphoryl) phosphate having the formula

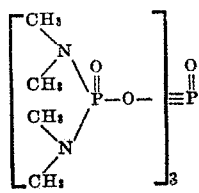

3. Tris(tetrabutyldiamidophosphoryl) phosphate having the formula

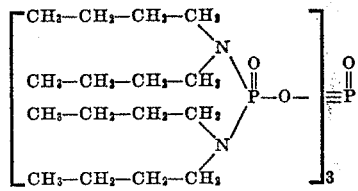

4. Tris(N,N-dimethyl-N',N' - dibutyldiamidophosphoryl) phosphate having the formula

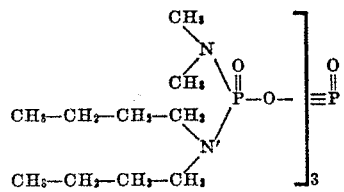

5. A method for producing polyphosphate compounds which comprises (1) admixing at least three molecular proportions of a compound of the formula

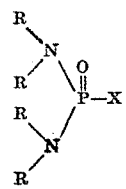

with one molecular proportion of a compound of the formula

in which formulae X is a member of the group consisting of chlorine and R—O— and Y is the other member of said group, and each R is an alkyl radical containing from 1 to 4 carbon atoms inclusive, and (2) heating said mixture at a temperature of from 90° to 135° C. until the evolution of alkyl chloride of reaction is substantially complete.

6. A method for the manufacture of tris(tetramethyldiamidophosphoryl) phosphate which comprises (1) admixing at least three molecular proportions of tetramethyldiamidophosphoric chloride with one molecular proportion of triethylphosphate and (2), heating said mixture at a temperature of from 90° to 135° C. until substantially all the chlorine in the tetramethyldiamidophosphoric chloride is liberated as by-product ethyl chloride.

HENRY TOLKMITH.

No references cited.